US009182312B2

(12) United States Patent
Kim et al.

(10) Patent No.: US 9,182,312 B2
(45) Date of Patent: Nov. 10, 2015

(54) CONTROL SYSTEM FOR A HYBRID EXCAVATOR

(75) Inventors: Jae-Hong Kim, Gimhae-si (KR); Chun-Han Lee, Gimhae-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 225 days.

(21) Appl. No.: 13/639,962

(22) PCT Filed: Jun. 28, 2010

(86) PCT No.: PCT/KR2010/004175
§ 371 (c)(1),
(2), (4) Date: Oct. 8, 2012

(87) PCT Pub. No.: WO2012/002585
PCT Pub. Date: Jan. 5, 2012

(65) Prior Publication Data

US 2013/0090771 A1   Apr. 11, 2013

(51) Int. Cl.
*B60W 10/24*   (2006.01)
*B60W 20/00*   (2006.01)
(Continued)

(52) U.S. Cl.
CPC .............. *G01M 1/22* (2013.01); *E02F 9/2025* (2013.01); *E02F 9/2075* (2013.01); *E02F 9/2091* (2013.01); *E02F 9/2246* (2013.01); *F16H 61/468* (2013.01); *B60W 2510/244* (2013.01)

(58) Field of Classification Search
CPC ..... B60W 10/06; B60W 10/08; B60W 10/26; B60W 20/00; B60W 2510/244; B60W 2510/1025; B60W 2540/06; B60W 2710/0666; B60W 2710/083; B60W 2710/105; Y02T 10/642; Y02T 10/7005; Y02T 10/7044; Y02T 10/705; B60L 11/1861; B60L 11/1862; B60L 15/2045; B60L 2240/423; B60L 2240/443; B60L 2260/54; B60K 6/20; Y10S 903/903; Y10S 903/904; Y10S 903/905; Y10S 903/906; E02F 9/2075
USPC ........ 180/65.1, 65.21, 65.265, 65.27, 65.275, 180/65.28, 65.285, 65.29, 65.25, 165; 701/22, 51, 54, 101; 700/286–288; 290/7, 31, 32, 34, 40 R, 40 C, 40 F; 903/903–907
See application file for complete search history.

(56) References Cited

U.S. PATENT DOCUMENTS 6,170,587 B1 *   1/2001   Bullock ...................... 180/69.6
6,376,927 B1 *   4/2002   Tamai et al. ................ 290/40 C
(Continued)

FOREIGN PATENT DOCUMENTS

CN   101037869 A   9/2007
JP   10-42587 A   2/1998
(Continued)

OTHER PUBLICATIONS

Written Opinion of the International Searching Authority (in Korean) for PCT/KR2010/004175, mailed Mar. 28, 2011; ISA/KR.
(Continued)

*Primary Examiner* — Crystal J Barnes-Bullock
(74) *Attorney, Agent, or Firm* — Harness, Dickey & Pierce, P.L.C.

(57) ABSTRACT

The present invention relates to a control system for a hybrid excavator including an engine, a hydraulic pump driven by the engine to drive a hydraulic actuator by hydraulic fluid, a generator driven by the engine to generate electric energy, and an energy storage device charging the electric energy generated by the generator and supplying the electric energy to an electric actuator, the control system comprising: a required torque detection means for detecting a torque that is required to drive the hydraulic pump; a charge amount detection means for detecting a charge rate (or charge amount) of the electric energy storage device; a memory storing a generation degree (or generation amount) in accordance with the torque and the charge rate (or charge amount); and a hybrid control means for controlling the generator in accordance with the torque value detected by the required torque detection means and the generation amount in a memory means that corresponds to the charge rate value (or charge amount) detected by the charge amount detection means. According to the control system, the fuel efficiency is optimized by driving the electric generator attached to the engine based on the required torque of the hydraulic pump and the preset generation amount value corresponding to the SOC (State Of Charge).

4 Claims, 4 Drawing Sheets

(51) Int. Cl.

| | | |
|---|---|---|
| *G05D 17/00* | (2006.01) | |
| *B60L 9/00* | (2006.01) | |
| *B60L 11/00* | (2006.01) | |
| *G06F 7/00* | (2006.01) | |
| *G06F 17/00* | (2006.01) | |
| *F02D 29/06* | (2006.01) | |
| *H02P 9/04* | (2006.01) | |
| *G01M 1/22* | (2006.01) | |
| *E02F 9/20* | (2006.01) | |
| *E02F 9/22* | (2006.01) | |
| *F16H 61/468* | (2010.01) | |

(56) References Cited

U.S. PATENT DOCUMENTS

| | | | |
|---|---|---|---|
| 6,480,767 B2 * | 11/2002 | Yamaguchi et al. | 701/22 |
| 6,820,356 B2 | 11/2004 | Naruse et al. | |
| 7,434,641 B2 * | 10/2008 | Takami et al. | 701/22 |
| 7,669,413 B2 | 3/2010 | Komiyama et al. | |
| 7,766,788 B2 * | 8/2010 | Shamoto | 477/3 |
| 7,971,666 B2 * | 7/2011 | Yamazaki et al. | 180/65.265 |
| 8,532,888 B2 * | 9/2013 | Ishibashi et al. | 701/51 |
| 8,606,442 B2 * | 12/2013 | Kang et al. | 701/22 |
| 2003/0226291 A1 | 12/2003 | Naruse et al. | |
| 2010/0332088 A1 | 12/2010 | Okano et al. | |

FOREIGN PATENT DOCUMENTS

| | | | |
|---|---|---|---|
| JP | 2001-099103 A | 4/2001 | |
| JP | 2003-009308 A | 1/2003 | |
| JP | 2004-150306 A | 5/2004 | |
| JP | 2004-300947 A | 10/2004 | |
| JP | 2005-083242 A | 3/2005 | |
| JP | 2005-304206 A | 10/2005 | |
| JP | 2006-275019 A | 10/2006 | |
| JP | 2007-151263 A | 6/2007 | |
| JP | 2008-123439 A | 5/2008 | |
| JP | 2008-255699 A | 10/2008 | |
| JP | 2008-279992 A | 11/2008 | |
| JP | 2010-133333 A | 6/2010 | |
| KR | 10-2003-0093943 A | 12/2003 | |
| KR | 10-2010-0057780 A | 6/2010 | |

OTHER PUBLICATIONS

International Preliminary Report on Patentability (Chapter II of the Patent Cooperation Treaty) for PCT/KR2010/004175 (in Korean), Issued Aug. 27, 2012.

International Search Report (in Korean with English Translation) for PCT/KR2010/004175, mailed Mar. 28, 2011; ISA/KR.

Extended European Search Report for Application No. EP 10 85 4131 dated Dec. 20, 2013 (7 pages).

Office Action issued by China State Intellectual Property Office, issued Jul. 3, 2014 (in Chinese with English Translation) (12 pages).

2nd Office Action issued by Japan Patent Office (in Japanese) for 2013-518200 (638871) (3 pages) (No English translation available).

1st Office Action issued by Japan Patent Office (in Japanese) for 2013-518200 (193475) (4 pages) (No English translation available).

* cited by examiner

FIG. 1

PRIOR ART

ISAM generation = √(SOC × Torque)

FIG. 4

| | | SOC Charge Rate | | | | | | | | | | |
|---|---|---|---|---|---|---|---|---|---|---|---|---|
| | | 0 | 0.1 | 0.2 | 0.3 | 0.4 | 0.5 | 0.6 | 0.7 | 0.8 | 0.9 | 1 |
| Pump Required Torque | 0 | 1.000 | 1.000 | 1.000 | 1.000 | 1.000 | 0.975 | 0.707 | 0.024 | 0.000 | 0.000 | 0.000 |
| | 0.1 | 1.000 | 1.000 | 1.000 | 1.000 | 1.000 | 0.987 | 0.841 | 0.473 | 0.000 | 0.000 | 0.000 |
| | 0.2 | 1.000 | 1.000 | 1.000 | 1.000 | 1.000 | 0.994 | 0.917 | 0.688 | 0.000 | 0.000 | 0.000 |
| | 0.3 | 1.000 | 1.000 | 1.000 | 1.000 | 1.000 | 0.997 | 0.958 | 0.829 | 0.000 | 0.000 | 0.000 |
| | 0.4 | 1.000 | 1.000 | 1.000 | 1.000 | 1.000 | 0.998 | 0.979 | 0.911 | 0.000 | 0.000 | 0.000 |
| | 0.5 | 0.894 | 0.894 | 0.894 | 0.894 | 0.894 | 0.894 | 0.885 | 0.854 | 0.000 | 0.000 | 0.000 |
| | 0.6 | 0.669 | 0.669 | 0.669 | 0.669 | 0.669 | 0.668 | 0.665 | 0.653 | 0.000 | 0.000 | 0.000 |
| | 0.7 | 0.336 | 0.336 | 0.336 | 0.336 | 0.336 | 0.366 | 0.365 | 0.361 | 0.000 | 0.000 | 0.000 |
| | 0.8 | 0.135 | 0.135 | 0.135 | 0.135 | 0.135 | 0.135 | 0.135 | 0.134 | 0.000 | 0.000 | 0.000 |
| | 0.9 | 0.000 | 0.000 | 0.000 | 0.000 | 0.000 | 0.000 | 0.000 | 0.000 | 0.000 | 0.000 | 0.000 |
| | 1 | 0.000 | 0.000 | 0.000 | 0.000 | 0.000 | 0.000 | 0.000 | 0.000 | 0.000 | 0.000 | 0.000 |

CONTROL SYSTEM FOR A HYBRID EXCAVATOR

The present invention relates to a control system for a hybrid excavator, and particularly to, a torque and SOC based control system for a hybrid excavator, in which an electric generator attached to an engine is driven based on a predetermined value representative of the amount of electricity generation corresponding to both the torque required to drive a hydraulic pump and the state of charge (SOC), thereby optimizing the fuel efficiency.

BACKGROUND ART

Figure 1:
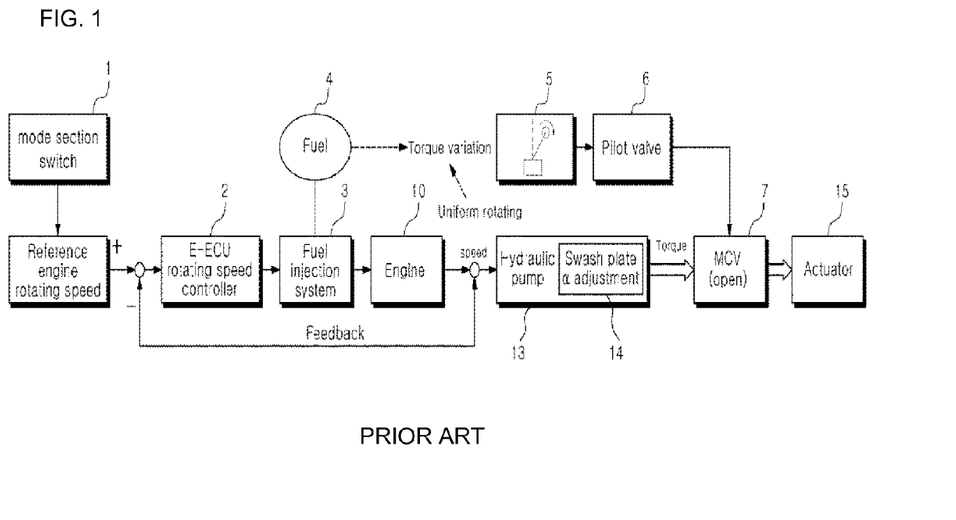
FIG. 1 is a necessary torque output relationship diagram illustrating an excavator system according to the prior art.

In general, a construction machine such as an excavator in the prior art adopts a hydraulic driving system in which a hydraulic pump is driven by a fuel engine and an actuator is driven by hydraulic pressure. Such a conventional excavator performs not only work that requires the maximum output power but also work that requires an output power lower than the maximum output power, for example, about 80% or 50% of the maximum output power. In the case of performing work with such a low output power, the engine efficiency and the fuel efficiency deteriorate. FIG. 1 is a necessary torque output relationship diagram illustrating an excavator system according to the prior art. As shown in FIG. 1, in a conventional hydraulic excavator, an opening area of a main control valve (MCV) 7 is adjusted in accordance with an output of a pilot valve 6 through a user's manipulation of a lever 5.

Hydraulic fluid discharged from a hydraulic pump 13 is transferred to respective hydraulic systems with its flow rate adjusted in accordance with the opening area of the MCV 7.

In such a conventional hydraulic excavator, it is sometimes required to perform work while greatly changing the output power of an engine so as to cope with a great load change, and it is required to seek the improvement of the engine's fuel efficiency by effectively utilizing the engine output. Accordingly, a hybrid technology using an electric generator that is adopted in a hybrid vehicle has been planned to be applied to an excavator. That is, a hybrid excavator has been proposed in which an electric generator is connected to an engine. According to the hybrid excavator, in the case of performing a light-load operation, the electric generator is operated to generate electricity to charge a battery using a portion of the engine output, while in the case of performing a swing operation or using another electric device, electric energy is supplied from the battery to drive the actuator.

However, the excavator has the characteristics of an engine output power, a torque/speed operation region, and a power transfer device, which are quite different from those of a hybrid vehicle, and thus it is not easy to apply the hybrid technology to the excavator. According to a control system for a hybrid excavator proposed in the prior art, in which the drive torque of the hydraulic pump and the output torque of the engine are simply compared with each other, such that the motor-generator generates power to charge a battery using a surplus engine output torque in the case of performing the light-load operation, whereas in the case of performing the heavy-load operation, electric energy charged in the battery is supplied to the motor-generator to operate the motor-generator as a motor so that the engine is supplemented as much as the shortage of the engine output torque, it is difficult to seek improvement of the fuel efficiency by effectively utilizing the output of the engine of the excavator which has the characteristics of working region of diverse loads, engine output, torque/speed operation region, and power transfer device which are quite different from those of the hybrid vehicle.

In particular, since the excavator performs various kinds of work, in which working loads are different from one another, such as excavating, dipping-out, leveling, pounding, and the like, the transmission technology for the hybrid vehicle is not adopted in the hybrid excavator in the prior art, and thus it is very difficult to optimize the fuel efficiency.

Further, in the excavator, if the relationship between the kind (or mode) of the work and the engine output or the battery charging state is not taken into consideration, problems, such as energy waste, deterioration of working efficiency, and the like, may occur.

DISCLOSURE OF INVENTION

Technical Problem

Accordingly, the present invention has been made to solve the above-mentioned problem occurring in the prior art, and it is an object of the present invention to provide a control system for a hybrid excavator that can optimize the fuel efficiency.

A second object of the present invention is to provide a torque and SOC based control system for a hybrid excavator, in which an electric generator attached to an engine is driven based on a predetermined value representative of the amount of electricity generation corresponding to a torque required to drive a hydraulic pump and a state of charge (SOC), thereby attaining the optimum fuel efficiency and the smooth operation of the engine in a repetitive work region.

A third object of the present invention is to provide a control system for a hybrid excavator, in which a swing motor-generator for a swing operation of an upper swing structure is installed and is operated by electric energy to accelerate the swing operation, and generates electric energy to be charged during deceleration of the swing operation, thereby further optimizing the fuel efficiency.

Technical Solution

To achieve the above objects, the present invention provides a control system for a hybrid excavator, which includes an engine, a hydraulic pump driven by the engine to drive a hydraulic actuator by hydraulic fluid discharged therefrom, an electric generator driven by the engine to generate electric energy, and an electric energy storage device for charging the electric energy generated by the electric generator and supplying the electric energy to an electric actuator, the control system comprising: a required torque detection means for detecting a torque that is required to drive the hydraulic pump; a charge amount detection means for detecting a charge rate (or charge amount) of the electric energy storage device; a memory for storing a degree of electricity generation (or amount of electricity generation) based on the torque and the charge rate (or charge amount); and a hybrid control means for controlling the electric generator based on the amount of electricity generation stored in the memory, which corresponds to both the torque value detected by the required torque detection means and the charge rate (or charge amount) value detected by the charge amount detection means.

Preferably, the electric generator attached to and driven by the engine may perform a motor function, and may operate the hydraulic pump together with the engine.

Also, preferably, the control system for a hybrid excavator may further comprise a charging means for charging the electric energy storage device by operating the engine in an appropriate torque region of a different revolution that is suitable for electricity generation if the required torque detection means detects a torque that is lower than a predetermined level, which is determined to correspond to a standby state in which no work is done.

Preferably, the control system for a hybrid excavator may further comprise an engine revolution adjustment unit for reducing the engine revolution to a low RPM with small fuel consumption if the required torque detection means detects a torque that is lower than a predetermined level, which is determined to correspond to a standby state in which no work is done.

Preferably, the control system for a hybrid excavator may further comprise an electric generator driving unit for driving the electric generator at a level that is higher than a predetermined level if the required torque detection means detects a torque that is lower than a predetermined level, which is determined to correspond to a standby state in which no work is done.

In addition, preferably, the control system for a hybrid excavator may further comprise a means for identifying movement of an excavator adjustment lever, so that if the adjustment lever is not operated, it is determined that the excavator is in a standby state in which no work is done, and an engine use region is controlled.

The control system, according to a preferred embodiment of the present invention, further includes a swing motor-generator which operates as a motor that accelerates a swing operation of an upper swing structure by electric energy supplied from the energy storage device, and which operates as an electric generator that generates electric energy by the moment of inertia during deceleration of the swing operation of the upper swing structure; wherein the hybrid control means controls the swing motor-generator to operate as an electric generator to charge the energy storage device with the generated electric energy when the swing operation of the upper swing structure is decelerated, and controls the supply of the electric energy from the energy storage device for a motor operation of the swing motor-generator.

Advantageous Effects

According to the control system for a hybrid excavator according to the present invention as constructed above, a superior fuel efficiency improvement effect can be expected by developing a torque and SOC based control technology in which the driving of electric generator is controlled based on a torque required for a hydraulic pump and a state of charge (SOC) for diverse working areas, and applying the developed control technology to the excavator, in comparison to the conventional technology in the prior art in which it is difficult to apply the hybrid technology developed through the existing hybrid vehicle to the excavator due to the absence of a transmission and the abrupt and frequent change of the necessary output torque.

In addition, a swing motor-generator for a swing operation of an upper swing structure is installed so that it is operated by electric energy to accelerate the swing operation and to generate power to be charged during deceleration of the swing operation, thereby achieving further improved engine efficiency and fuel efficiency.

It is obvious to those skilled in the art that various effects, which are not directly described in diverse embodiments of the present invention, can be derived from various configurations according to the embodiments of the present invention.

BRIEF DESCRIPTION OF THE DRAWINGS

The above and other objects, features and advantages of the present invention will be more apparent from the following detailed description taken in conjunction with the accompanying drawings, in which.

BEST MODE FOR CARRYING OUT THE INVENTION

Now, preferred embodiments of a control system for a hybrid excavator according to the present invention will be described hereinafter in detail with reference to the accompanying drawings.

Figure 2:
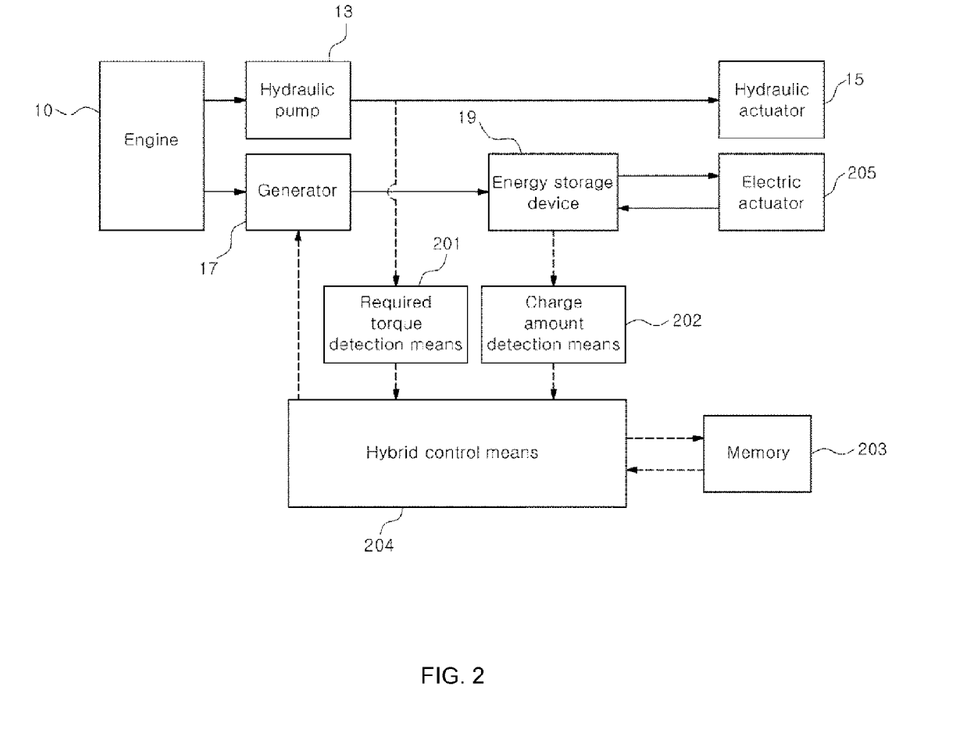
FIG. 2 is a schematic block diagram illustrating the configuration of a control system for a hybrid excavator according to the present invention.

FIG. 2 is a schematic block diagram illustrating the configuration of a control system for a hybrid excavator according to the present invention.

Referring to FIG. 2, a control system for a hybrid excavator according to the present invention includes an engine 10, a hydraulic pump 13 driven by the engine 10 to drive a hydraulic actuator by hydraulic fluid discharged therefrom, an electric generator 17 driven by the engine 10 to generate electric energy or power, and an electric energy storage device (for example, battery) 19 for charging the electric energy generated by the electric generator and supplying the electric energy to an electric actuator 205. The control system further includes: a required torque detection means 201 for detecting a torque that is required to drive the hydraulic pump 13; a charge amount detection means 202 for detecting a charge rate (or charge amount) of the electric energy storage device 19; a memory 203 for storing information on different degrees of electricity generation (or amount of electricity generation) based on the torque and the charge rate (or charge amount); and a hybrid control means 204 for controlling the electric generator 17 based on the amount of electricity generation stored in the memory 203, which corresponds to both the torque value detected by the required torque detection means 201 and the charge rate (or charge amount) value detected by the charge amount detection means 202.

In addition, the electric generator 17 attached to and driven by the engine 10 performs a motor function, and operates the hydraulic pump 13 together with the engine 10.

Also, the control system further includes a charging means (not shown) for charging the electric energy storage device 19 by operating the engine 10 in an appropriate torque region of a different revolution that is suitable for electricity generation if the required torque detection means 201 detects a torque that is lower than a predetermined level, which is determined to correspond a standby state in which no work is done.

Further, the control system further includes an engine revolution adjustment unit for reducing the engine revolution to a low RPM with small fuel consumption if the required torque detection means 201 detects a torque that is lower than a predetermined level, which is determined to correspond to a standby state in which no work is done.

Additionally, the control system further includes an electric generator driving unit for driving the electric generator 17 at a level that is higher than a predetermined level if the required torque detection means detects a torque that is lower than a predetermined level, which is determined to correspond a standby state in which no work is done.

Moreover, the control system further includes a means for identifying movement of an excavator adjustment lever, so that if the adjustment lever is not operated, it is determined that the excavator is in a standby state in which no work is done, and an engine use region is controlled.

The hybrid control means 204 is configured such that it receives a necessary torque value required to drive the hydraulic pump from the required torque detection means 201 and the charge rate value (or charge amount) of the energy storage device 19 from the charge amount detection means 202, respectively, so that the hybrid control means controls the electric generator 17 based on the amount of electricity generation stored in the memory 203, which corresponds to the received torque value and charge rate (or charge amount) value.

Figure 3:
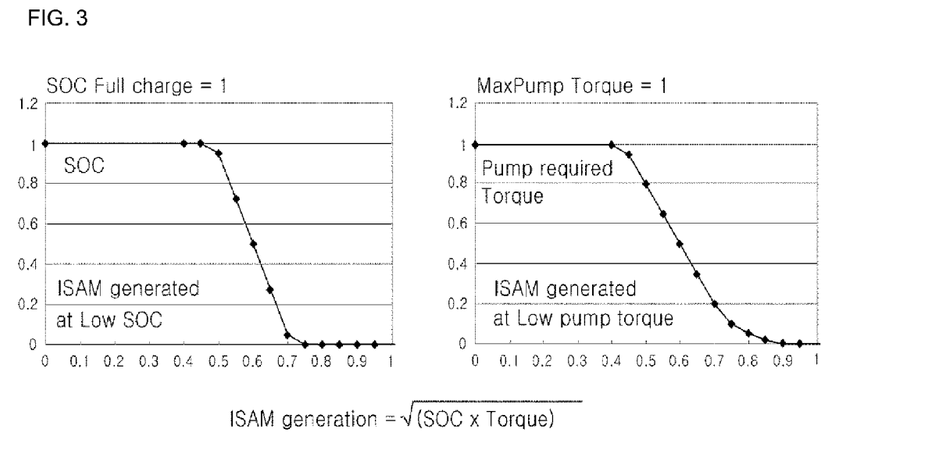
FIG. 3 is a graph illustrating an example of determining the amount of electricity generation based on the necessary torque required to drive a hydraulic pump and a state of charge (SOC)

FIG. 3 is a graph illustrating an example of determining the amount of electricity generation based on a necessary torque required to drive a hydraulic pump and a state of charge (SOC).

Referring to FIG. 3, the amount of electricity generation is determined through a method in which a value for the necessary torque of the hydraulic pump and a value for the SOC are set separately and are calculated with each other. The control system of the present invention includes a memory that stores the amount of electricity generation based on both the necessary torque of the hydraulic pump and the SOC so that the amount of electricity generation corresponding to both torque and SOC values can be read from the memory.

Figure 4:
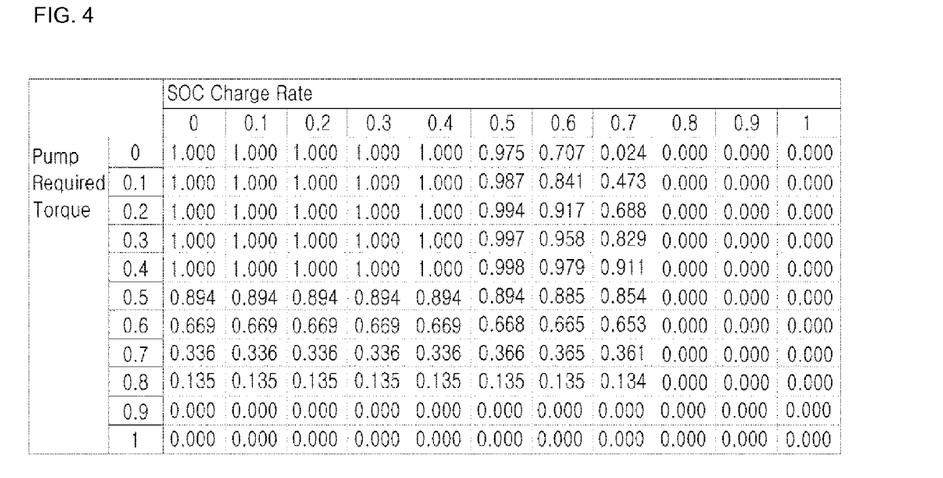
FIG. 4 is a table illustrating another example of determining the amount of electricity generation based on the necessary torque required to drive a hydraulic pump and a state of charge (SOC) using the table.

FIG. 4 shows another example of determining the amount of electricity generation using a table which is preset. That is, as an example of finding the electricity generation ratio of the electric generator, the amount of electricity generation based on the necessary torque of the hydraulic pump and the SOC is previously configured in a table for the two variables and a value representative of the amount of electricity generation is extracted which corresponds to the two variables (i.e., the necessary torque of the hydraulic pump and the SOC) for the table. For example, in the case where the necessary torque value of the hydraulic pump inputted to the required torque detection means 201 is 0.6 and the SOC value is 0.1, a value 0.669 corresponding to the two values is extracted as the amount of electricity generation.

Figure 5:
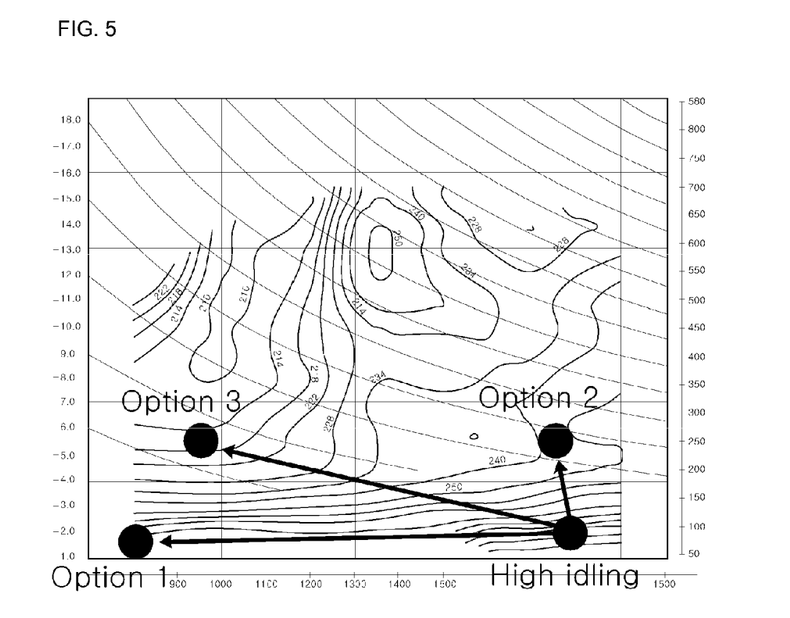
FIG. 5 is a view illustrating an engine use region in an embodiment in which electricity is generated to avoid idling at high RPM with low engine efficiency, electricity is generated by converting high engine revolution into low engine revolution, or the engine use region is changed while idling at low RPM.

FIG. 5 is a view illustrating an engine use region in an embodiment in which electricity is generated to avoid idling at high RPM with low engine efficiency, electricity is generated by converting high engine revolution into low engine revolution, or the engine use region is changed with idling at low RPM.

Referring to FIG. 5 typically, an engine operation is set to high engine revolution in order for the worker of the excavator to obtain a desired output power. When the worker performs an excavation work, the torque of the engine is increased while the engine revolution is nearly maintained. In this case, if no work is done, the torque of the engine is reduced but the engine is still maintained at a high revolution. The engine efficiency is particularly low in this idling region (high idling) in which no work is done externally at high revolution. Thus, it is preferable to avoid the operation of the engine in this region. Idling at high RPM (high idling) can be prevented through several methods as listed in a table 1 below.

TABLE 1

| No. | Methods |
|---|---|
| 1 | A method in which an engine revolution is reduced without generating power to cause idling (low idling) to reduce fuel consumption. |
| 2 | A method in which the electric generator is operated while maintaining high engine revolution to charge an electric storage device to a level which is higher than a predetermined level, and then the engine revolution is made low to cause idling (i.e., low idling) to reduce the fuel consumption. |
| 3 | A method in which the engine revolution is made low and the electric generator is operated at low engine revolution to charge the electric storage device to a level which is higher than a predetermined level, and then the engine revolution is made low to cause idling (i.e., low idling) to reduce the fuel consumption. |

Figure 6:
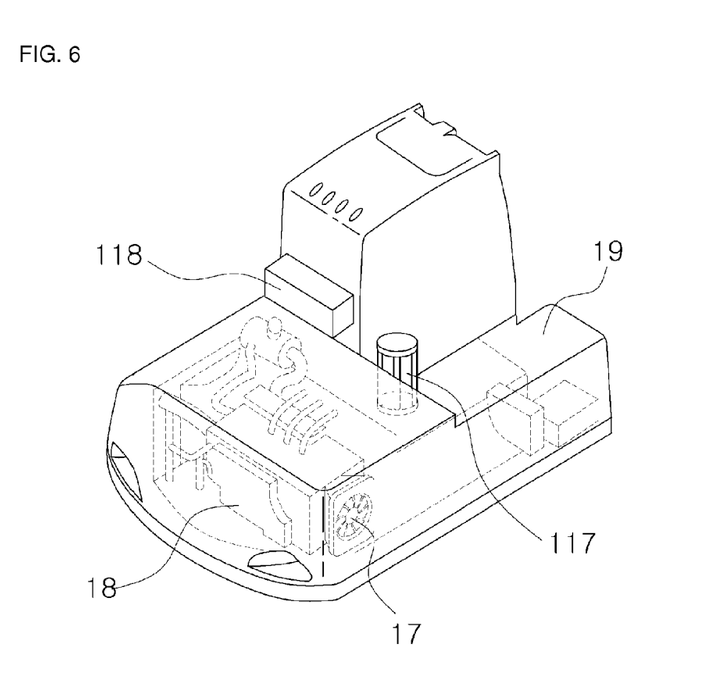
FIG. 6 is a schematic view illustrating the external configuration of a hybrid excavator according to the present invention.

FIG. 6 is a schematic view illustrating the external configuration of a hybrid excavator according to the present invention.

Referring to FIG. 6, the hybrid excavator includes an electric generator 17 attached to an engine, an electric energy storage device 19, a swing motor-generator 117 for performing a swing operation, and a driver 18 for driving the electric generator.

Basically, the swing motor-generator 117 accelerates the swing operation of an upper swing structure using electric energy stored in the electric energy storage device 19, and generates the electric energy to be charged in the electric energy storage device 19 during deceleration of the swing operation.

Since electric energy used during the acceleration of the swing operation is larger than the electric energy generated during the deceleration of the swing operation due to the efficiency and friction of the electric motor-generator, power is preferably generated using the electric generator 17 attached to the engine.

The operation of the control system for a hybrid excavator as constructed above according to the present invention will be described hereinafter with reference to FIG. 2.

Referring to FIG. 2, first, the memory 203 has stored therein information on the degree of electricity generation (or the amount of electricity generation), which corresponds to different torque and charge rate values. Thereafter, if the required torque detection means 201 detects a torque required to drive the hydraulic pump 13 and the charge amount detection means 202 detects the charge rate (or charge amount) of the energy storage device 19 (for example, battery), the hybrid control means 204 receives the necessary torque value required to drive the hydraulic pump 13 from the required torque detection means 201 and a charge rate (or charge amount) value of the energy storage device 19, respectively. Then, the hybrid control means 204 can read out the amount of electricity generation, which corresponds to the received torque and charge rate (or charge amount) values from the memory 203 among information on the amount of electricity generation stored in the memory 203, and then controls the electric generator 17 based on reading the amount of electricity generation information.

INDUSTRIAL APPLICABILITY

The control system for a hybrid excavator according to the present invention can be usefully utilized in a construction machine, particularly an excavator, which can obtain a superior fuel efficiency improvement effect by developing a torque and SOC based control technology in which the driving of electric generator is controlled based on a torque required for a hydraulic pump and a state of charge (SOC) for diverse working areas, and applying the developed control technology to the excavator, in order to overcome the to problems involved in the conventional technology in the prior art in which it is difficult to apply the hybrid technology developed through the existing hybrid vehicle to the excavator due to the absence of a transmission and the abrupt and frequent change of the necessary output torque.

The invention claimed is:

1. A control system for a hybrid excavator including an engine, a hydraulic pump driven by the engine to drive a hydraulic actuator by hydraulic fluid discharged therefrom, an electric generator driven by the engine to generate electric energy, and an electric energy storage device for storing the electric energy generated by the electric generator and supplying the electric energy to an electric actuator, the control system comprising:
   a torque detector configured to detect a torque that is required to drive the hydraulic pump;
   a charge detector configured to detect a charge rate (or charge amount) of the electric energy storage device;
   a storage device configured to store a degree of electricity generation (or amount of electricity generation) based on the torque and the charge rate (or charge amount); and
   a hybrid controller configured to control the electric generator based on the amount of electricity generation stored in the storage device, which corresponds to both the torque value detected by the torque detector and the charge rate (or charge amount) value detected by the charge detector; and
   an engine revolution adjuster configured to adjust engine revolution;
   wherein:
      the electric generator attached to and driven by the engine acts as a motor, to which electric energy is supplied from the electric energy storage device, and operates the hydraulic pump together with the engine;
      if the torque detector detects a torque that is lower than a predetermined level, which is determined to correspond to a standby state in which no work is being done by the hybrid excavator, the hybrid controller performs a hybrid control including the following:
         when the charge rate or charge amount detected by the charge detector is higher than a predetermined level, the engine revolution adjuster reduces the engine revolution to a low RPM with low fuel consumption; and
         when the charge rate or charge amount detected by the charge detector is lower than the predetermined level, the electric generator is driven by operating the engine in an appropriate torque region of a different revolution that is suitable for electricity generation, generates and charges the electric energy storage device, and after the charge rate or charge amount detected by the charge detector becomes higher than the predetermined level, the engine revolution adjuster reduces the engine revolution to a low RPM with low fuel consumption.

2. The control system for a hybrid excavator according to claim 1, further comprising a movement identifier configured to identify movement of an excavator adjustment lever, so that if the adjustment lever is not operated and if the torque detector detects a torque that is not lower than the predetermined level, it is determined that the excavator is in the standby state in which no work is done by the hybrid excavator and the hybrid controller performing the hybrid control.

3. A method for controlling a hybrid excavator including an engine, a hydraulic pump driven by the engine to drive a hydraulic actuator by hydraulic fluid discharged therefrom, an electric generator driven by the engine to generate electric energy, and an electric energy storage device for storing the electric energy generated by the electric generator and supplying the electric energy to an electric actuator, the method comprising:
   performing a hybrid control of the hybrid excavator when a torque detector detects that a torque required to drive the hydraulic pump is below a predetermined level, which corresponds to a standby state in which no work is being done by the hybrid excavator;
   when the charge rate or charge amount detected by the charge detector is higher than a predetermined level, reducing the engine revolution to a low RPM with low fuel consumption; and
   when a charge rate or charge amount detected by a charge detector is lower than the predetermined level, driving the electric generator by operating the engine in a torque region of a revolution that is suitable to generate electricity, generates and charges the electric energy storage device, and after the charge rate or charge amount detected by the charge detector becomes higher than the predetermined level, reducing the engine revolution to the low RPM with low fuel consumption.

4. A control system for a hybrid excavator including an engine, a hydraulic pump driven by the engine to drive a hydraulic actuator by hydraulic fluid discharged therefrom, an electric generator driven by the engine to generate electric energy, and an electric energy storage device for storing the electric energy generated by the electric generator and supplying the electric energy to an electric actuator, the electric generator operates the hydraulic pump together with the engine and is a motor to which electric energy is supplied from the electric energy storage device, the control system comprising:
   a torque detector configured to detect a torque that is required to drive the hydraulic pump;
   a charge detector configured to detect a charge rate of the electric energy storage device;
   a storage device configured to store an amount of electricity generation based on the torque and the charge rate; and
   a hybrid controller configured to control the electric generator based on the amount of electricity generation stored in the storage device, which corresponds to both a torque value detected by the torque detector and a charge rate value detected by the charge detector, the hybrid controller performs a hybrid control if the torque detector detects a torque that is lower than a predetermined level, which is determined to correspond to a standby state in which no work is being done by the hybrid excavator;

wherein the hybrid control includes the following:
- when the charge rate or charge amount detected by the charge detector is higher than a predetermined level, the engine revolution adjuster reduces the engine revolution to a low RPM with low fuel consumption; and
- when the charge rate or charge amount detected by the charge detector is lower than the predetermined value, the electric generator is driven by operating the engine in a torque region of a different revolution that is suitable for electricity generation, generates and charges the electric energy storage device, and after the charge rate or charge amount detected by the charge detector becomes higher than the predetermined value, the engine revolution adjuster reduces the engine revolution to a low RPM with low fuel consumption.

\* \* \* \* \*